(12) United States Patent
Haase et al.

(10) Patent No.: US 11,952,955 B2
(45) Date of Patent: Apr. 9, 2024

(54) METHOD FOR OPERATING A MULTIPLE DIRECT INJECTION INTERNAL COMBUSTION ENGINE AND MASS-BASED SWITCHING OF THE NUMBER OF INJECTIONS

(71) Applicant: Volkswagen Aktiengesellschaft, Wolfsburg (DE)

(72) Inventors: Stefan Haase, Wolfsburg (DE); Lasse Fruehling, Hamburg (DE); Mario Beyer, Berlin (DE); Rene Matschenz, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/124,916

(22) Filed: Mar. 22, 2023

(65) Prior Publication Data

US 2023/0304455 A1 Sep. 28, 2023

(30) Foreign Application Priority Data

Mar. 23, 2022 (DE) ...................... 10 2022 106 869.2

(51) Int. Cl.
| | |
|---|---|
| *F02D 41/40* | (2006.01) |
| *F02D 41/02* | (2006.01) |
| *F02D 41/06* | (2006.01) |
| *F02D 41/38* | (2006.01) |

(52) U.S. Cl.
CPC ......... *F02D 41/402* (2013.01); *F02D 41/024* (2013.01); *F02D 41/029* (2013.01); *F02D 41/064* (2013.01); *F02D 2041/389* (2013.01); *F02D 2200/0602* (2013.01); *F02D 2200/0614* (2013.01)

(58) Field of Classification Search
CPC .... F02D 41/402; F02D 41/024; F02D 41/029; F02D 41/064; F02D 2041/389; F02D 2200/0602; F02D 2200/0614
See application file for complete search history.

(56) References Cited

U.S. PATENT DOCUMENTS

| | | |
|---|---|---|
| 6,318,074 B1 | 11/2001 | Nishimura et al. |
| 6,912,991 B2 | 7/2005 | Herden |
| 7,219,005 B2 | 5/2007 | Mazet |
| 8,539,933 B2 | 9/2013 | Cowgill et al. |
| 9,752,529 B2 | 9/2017 | Mitani et al. |
| 10,697,384 B2 | 6/2020 | Higuchi et al. |
| 2003/0233997 A1 | 12/2003 | Kawaguchi et al. |
| 2004/0163379 A1 | 8/2004 | Pott et al. |
| 2012/0089318 A1* | 4/2012 | Ruggiano ........... F02D 41/0002 701/103 |

(Continued)

FOREIGN PATENT DOCUMENTS

| | | |
|---|---|---|
| DE | 10105755 A1 | 8/2002 |
| DE | 10114050 A1 | 10/2002 |

(Continued)

*Primary Examiner* — Joseph J Dallo

(74) *Attorney, Agent, or Firm* — Muncy, Geissler, Olds & Lowe, P.C.

(57) ABSTRACT

A method for operating an internal combustion engine, in particular of a motor vehicle, wherein fuel is injected in a fuel injection device in a plurality of time-spaced partial injections per duty cycle directly into a combustion chamber of the internal combustion engine.

11 Claims, 9 Drawing Sheets

(56) References Cited

U.S. PATENT DOCUMENTS

| | | | | |
|---|---|---|---|---|
| 2015/0322909 A1* | 11/2015 | Cavanna | ................... | F02B 5/02 |
| | | | | 73/114.45 |
| 2015/0369158 A1* | 12/2015 | Nakajima | ............ | F02D 41/402 |
| | | | | 123/480 |
| 2015/0369161 A1* | 12/2015 | Nakano | ............... | F02D 41/3094 |
| | | | | 123/480 |
| 2018/0149108 A1* | 5/2018 | Han | ........................ | F02D 41/34 |
| 2018/0252175 A1* | 9/2018 | Ikejiri | ....................... | F01N 3/10 |
| 2018/0306106 A1* | 10/2018 | Glugla | ................... | F02D 15/02 |

FOREIGN PATENT DOCUMENTS

| | | | |
|---|---|---|---|
| DE | 10162115 A1 | 6/2003 | |
| DE | 10236856 A1 | 2/2004 | |
| DE | 102004046628 A1 | 4/2006 | |
| DE | 602004003390 T2 | 10/2007 | |
| DE | 102012000688 A1 | 7/2012 | |
| DE | 102016109772 A1 | 12/2016 | |
| DE | 112014003993 B4 | 8/2017 | |
| DE | 102018209096 A1 | 12/2019 | |
| DE | 102019001518 A1 | 9/2020 | |
| EP | 0982489 B1 | 10/2003 | |
| WO | WO-03031792 A1 * | 4/2003 | ......... F02D 41/1498 |
| WO | WO2012045850 A2 | 4/2012 | |

* cited by examiner

METHOD FOR OPERATING A MULTIPLE DIRECT INJECTION INTERNAL COMBUSTION ENGINE AND MASS-BASED SWITCHING OF THE NUMBER OF INJECTIONS

This nonprovisional application claims priority under 35 U.S.C. § 119(a) to German Patent Application No. 10 2022 106 869.2, which was filed in Germany on Mar. 23, 2022, and which is herein incorporated by reference.

BACKGROUND OF THE INVENTION

Field of the Invention

The invention relates to a method for operating an internal combustion engine, in particular of a motor vehicle, in which fuel is injected in a fuel injection device directly into a combustion chamber of the internal combustion engine in a plurality of time-spaced partial injections per duty cycle.

Description of the Background Art

The raw emission level, especially HC, NMHC emissions and the number of soot particles, at low engine temperatures is very high. This can be counteracted with better mixture formation in the combustion chamber by increasing the number of possible injections. This is particularly necessary for cold start and warm-up until the combustion chamber and exhaust gas aftertreatment are at operating temperature.

As general prior art, for example, five time-spaced short injection pulses per duty cycle are known, which are injected directly into a combustion chamber of the internal combustion engine. With regard to exhaust gas aftertreatment, additional technologies are used, such as e-catalytic converters in the exhaust system, burners in the exhaust system or secondary air systems in the exhaust system for rapid heating of the catalytic converter. To lower the raw emission level, particle storage systems such as HC absorbers and particulate filters are used.

The document DE 101 05 755 A1, which corresponds to US 2004/0040534, describes a method for operating a combustion engine, in particular of a motor vehicle, in which the fuel is injected with at least one injection per duty cycle directly into a combustion chamber of the internal combustion engine, which is characterized in that a fuel injection comprises a plurality of time-spaced short injection pulses.

The document DE 10 2018 209 096 A1 describes a catalytic converter heating operation for a catalytic converter. Here, an air ratio of A 1 is selected. After the load change-top dead center, the first injection of a first quantity of fuel takes place with the closure element fully open and then a second injection with an only partially open closure element. The second injection takes place after exceeding the ignition-top dead center with a second amount of fuel. Subsequently, an ignition takes place at the time of ignition. In catalytic converter heating mode, the advantage of injecting close to the ignition can also be used. As a result, raw particulate emissions as well as raw nitrogen oxide emissions can be reduced, especially during cold starts. Multiple injections are also possible. For example, one or more additional injections may be carried out in a lean combustion operation before and after the ignition time. Likewise, one or more fuel injections can be carried out in the catalytic converter heating mode before and after the ignition time.

The document DE 10 2004 046 628 A1 discloses that the quantity of fuel, when the fuel pressure in the pressure accumulator is below a threshold value, is provided in a plurality of injection pulses instead of in a single injection by distributing the amount of fuel.

The starting point of the invention is gasoline direct injection. In this process, the fuel is injected into the combustion chamber of the internal combustion engine at very high pressure via injectors located directly on the combustion chamber. The internal combustion engine works cyclically in a well-known manner. For example, in a four-stroke internal combustion engine, a duty cycle comprises four working strokes. As explained above, incomplete combustion of the injected fuel leads to HC, NMHC emissions. It is known that this problem occurs increasingly in the cold state of the internal combustion engine, in which the exhaust system is still cold and is particularly stressed.

SUMMARY OF THE INVENTION

It is therefore an object of the present invention to further develop conventional methods for gasoline engine direct injection, so that fuel consumption is further optimized, that is, reduced, and at the same time the emissions are reduced, in particular to relieve the exhaust system. The object is also to reduce the entry of gasoline into the oil of the internal combustion engine as significantly as possible.

The starting point of the invention is thus a method for operating an internal combustion engine, in particular of a motor vehicle, in which fuel is injected in a fuel injection device directly into a combustion chamber of the internal combustion engine in a plurality of time-spaced partial injections per duty cycle, comprising the steps of:

Determining the total injection mass per duty cycle into the combustion chamber as a function of an output requirement for the internal combustion engine as a function of an air mass supplied to the combustion chamber and producing a fuel/air mixture, taking into account a given air-fuel ratio;

Verifying a maximum possible number of partial injections per duty cycle as a function of a critical mass threshold of a fuel injector associated with the respective combustion chamber, in which the fuel mass per partial injection is not undercut, and of the desired specific total fuel mass to be injected per duty cycle;

Determining a mass-based target injection number as a function of the verified maximum possible number of partial injections and distributing the total fuel mass to the specified mass-based target injection number;

Injecting the total fuel mass per duty cycle according to the mass-based target injection number with the fuel masses distributed to the partial injections.

It is preferably provided that by verifying, a mass-based switching of a previously verified target injection number to a lower maximum possible verified target injection number due to a possible undercut of the critical mass threshold, which is defined as a function of on rail pressure at a minimum possible opening time of the fuel injector, is performed.

This is followed by determining a distribution of the total fuel mass to the verified maximum possible lower number of partial injections.

It is further preferred that by verifying, a mass-based switching of a previously verified target injection number to a maximum possible verified target injection number, taking into account the possible undercut of the critical mass threshold, which is achieved as a function of rail pressure at a minimum possible opening time of the fuel injector, is always performed.

Likewise, a distribution of the total fuel mass to the verified maximum possible number of partial injections is then determined.

Furthermore, it is preferably provided that in a duty cycle, within the intake and compression phase, mass-based multiple partial injections are made, wherein at different injection times multiple partial injections, in particular up to ten partial injections, in particular in two injection bundles, are distributed to the intake and compression phase.

In addition, it is preferably provided that the mass-based switching to a verified lower number of partial injections is carried out in a timely manner so that the critical mass threshold value of at least one of the partial injections is not undercut, in which the distribution of the total injection mass within the verified possible number of partial injections is safely possible.

It is also preferably provided that the mass-based switching to a verified maximum possible number of partial injections is carried out when a mass threshold is reached at which the distribution of the total injection mass within the verified maximum possible number of partial injections is safely possible.

The method is also preferably characterized in that a switching back and forth in a hysteresis between the critical mass threshold and the mass threshold value takes place.

The method is particularly advantageous in certain operating states. Preferably, in addition to the actual mass-based operation, the method is applied in normal operation such that the switching of the previously verified target injection number is carried out starting from a stoichiometric operation of the internal combustion engine in a a) cold start (start adaptation) and/or a b) catalytic converter diagnosis (parallelization) and/or a c) catalytic converter purging and/or a d) component protection event, deviating from stoichiometric operation, so that a change in the total fuel mass put through per duty cycle and, if necessary, the verified target injection number, is achieved.

A further exemplary use is carried out in such a way that the switching of the previously verified target injection number is made when the air-fuel mixture has stabilized to a stoichiometric value, and the internal combustion engine is operated in the torque reserve, such as idling, catalytic converter heating, particulate filter regeneration and coolant heating, wherein as a function of a deterioration in the efficiency of the internal combustion engine, switching to at least one additional partial injection is carried out, so that an increase in the verified target injection numbers is made.

In summary, a specific method for direct injection is proposed whose "mass-based injection timing" is explained in detail below.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
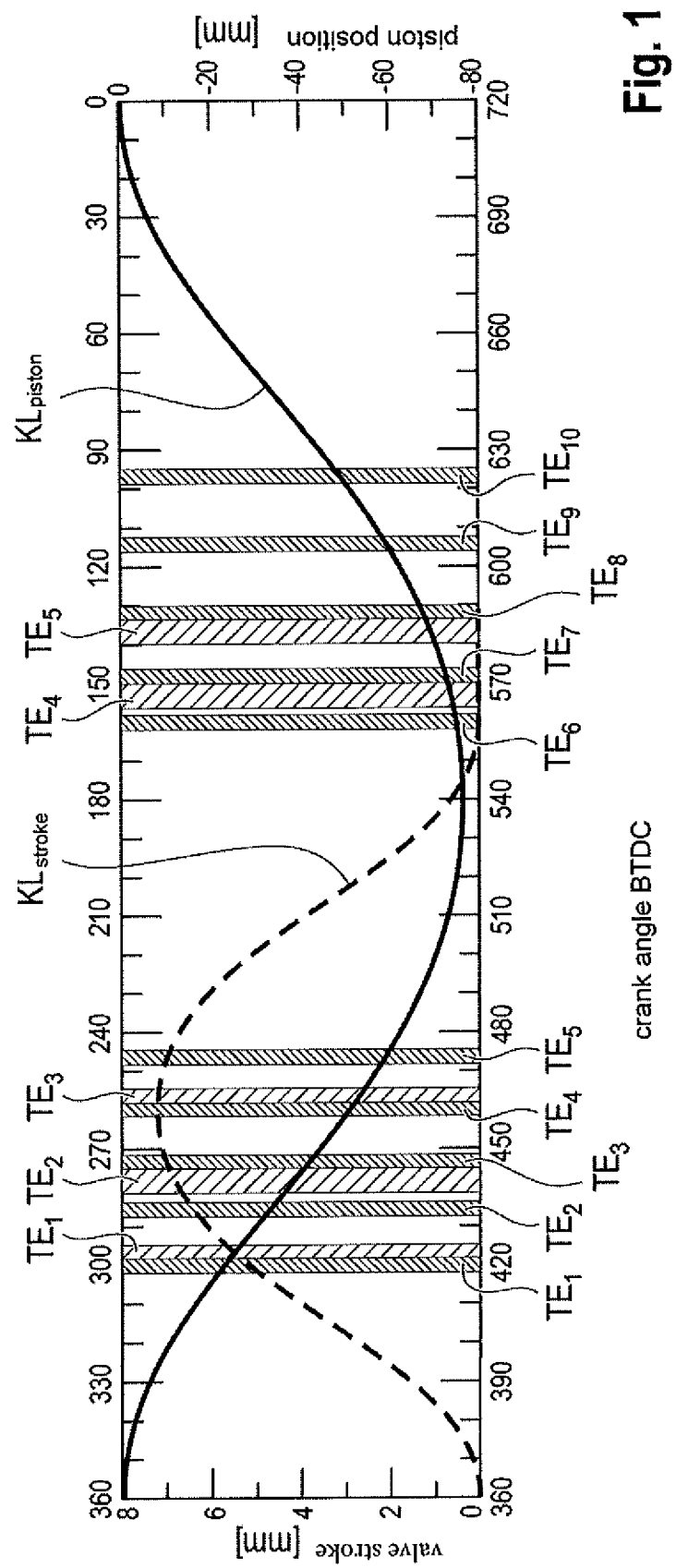
FIG. 1 is a diagram with two abscissas, wherein on the first abscissa the injection time (in ° KW vor ZOT) and on the second abscissa the crank angle (in ° KW) of an internal combustion engine are plotted, wherein the abscissas are assigned a first ordinate, on which the valve stroke of an air intake valve (in mm) associated with a cylinder of the internal combustion engine is plotted, and a second ordinate, on which the piston position of the piston located in the same cylinder (in mm) is plotted.

FIG. 1 shows a diagram with two abscissas, wherein on the first abscissa the injection times (in ° KW vor ZOT) and on the second abscissa the crank angle KW (in ° KW) of an internal combustion engine are plotted. The valve stroke of a high-pressure fuel injection valve (in mm) assigned to a cylinder of the internal combustion engine is plotted on a first ordinate. On the second ordinate, the piston position of the piston arranged in the same cylinder (in mm) is plotted.

An unspecified internal combustion engine is operated in a known manner according to the four-stroke principle, a duty cycle therefore comprises four cycles. It comprises a combustion chamber to which air is supplied via an intake pipe as a function of an opening and closing intake valve according to the stroke characteristic $KL_{Hub}$.

Fuel is injected into the combustion chamber through the unspecified fuel injection valve. The fuel injector is fed from an unshown fuel collection line, which is also referred to as a "rail" and in which the fuel is provided under very high pressure, for example 350 bar. The ignition of the fuel-air mixture formed in the combustion chamber is carried out by an unspecified ignition device, in particular a spark plug. By the expansion of the burning air-fuel mixture a piston is moved in a known manner, whose piston characteristic $KL_{Kolben}$ is shown in FIG. 1.

The operating state of the internal combustion engine, in particular the position of the piston, is detected by an unspecified sensor. The hot combustion exhaust gases are discharged in a known manner via an exhaust pipe and fed to a catalytic converter, also not shown, within an unshown exhaust system.

The internal combustion engine comprises a control and regulation device to which the power requirement of a user is communicated by an accelerator pedal. Furthermore, the control and regulation device receives signals from a sensor which detects the relevant angle ° KW of the crankshaft KW of the internal combustion engine and transmits a corresponding signal to the control and regulation device. On the output side, the control and regulation device is also connected, among other things, to the injection valve of an injection system and to the ignition system for igniting the air-fuel mixture.

In order to achieve homogenization, i.e., a mixture that is as uniform as possible between the fuel injected by the injector into the combustion chamber and the air drawn in through the intake manifold, the fuel is generally injected very early, that is, at the beginning of the downward movement of the piston in the intake phase of the internal combustion engine.

In the conventional operation shown in FIG. 1, three partial injections $TE_{n=3}$; $TE_1$, $TE_2$, $TE_3$ are injected according to parametrization in a map at specified crank angles ° KW, at 300° KW, 275° KW and at 260° KW, in an early injection bundle in the intake phase.

A fourth and fifth partial injection $TE_{n=2}$; $TE_4$, $TE_5$, takes place in the specific exemplary operating point BP in the conventional operation in a late injection bundle in the compression stroke at predetermined crank angles ° KW at 155° KW and at 140° KW.

Figure 2:
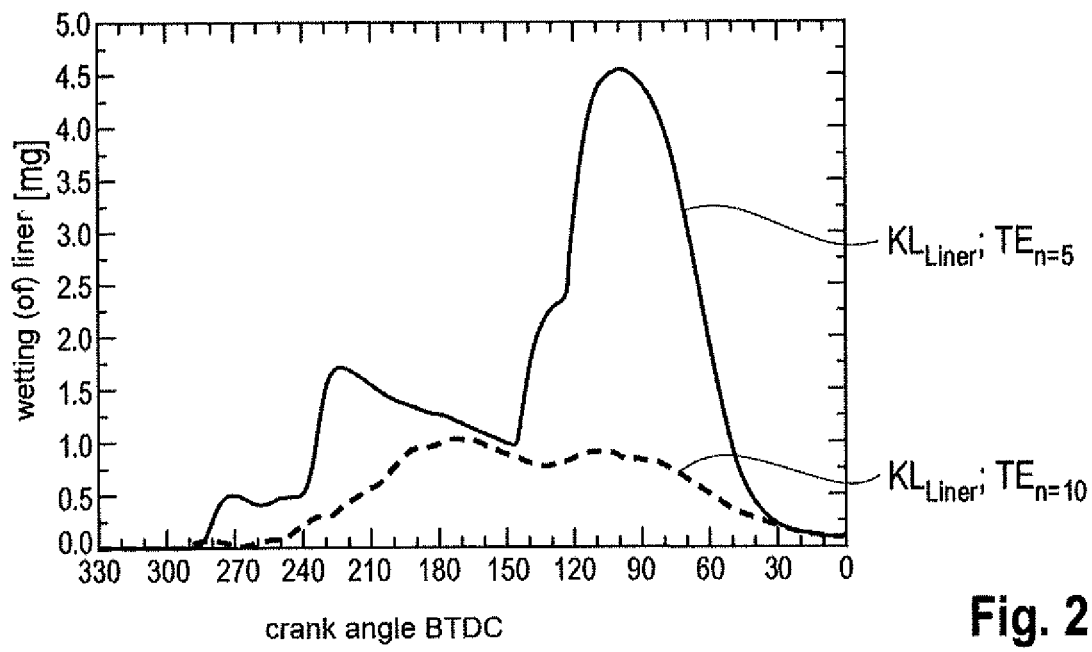
FIG. 2 is a diagram on whose abscissa the crank angle (in ° KW) is plotted, wherein on the ordinate the wetting of a cylinder inner wall (in mg) is plotted.

In an operation with a maximum of five of the partial injections $TE_n=5$ shown in FIG. 1, for example, there is a wetting of the cylinder inner wall, the so-called liner, which is shown analogous to FIG. 1 in the characteristic curve $KL_{Liner}$ in FIG. 2 as a function of the position of the crankshaft in ° KW.

Figure 3:
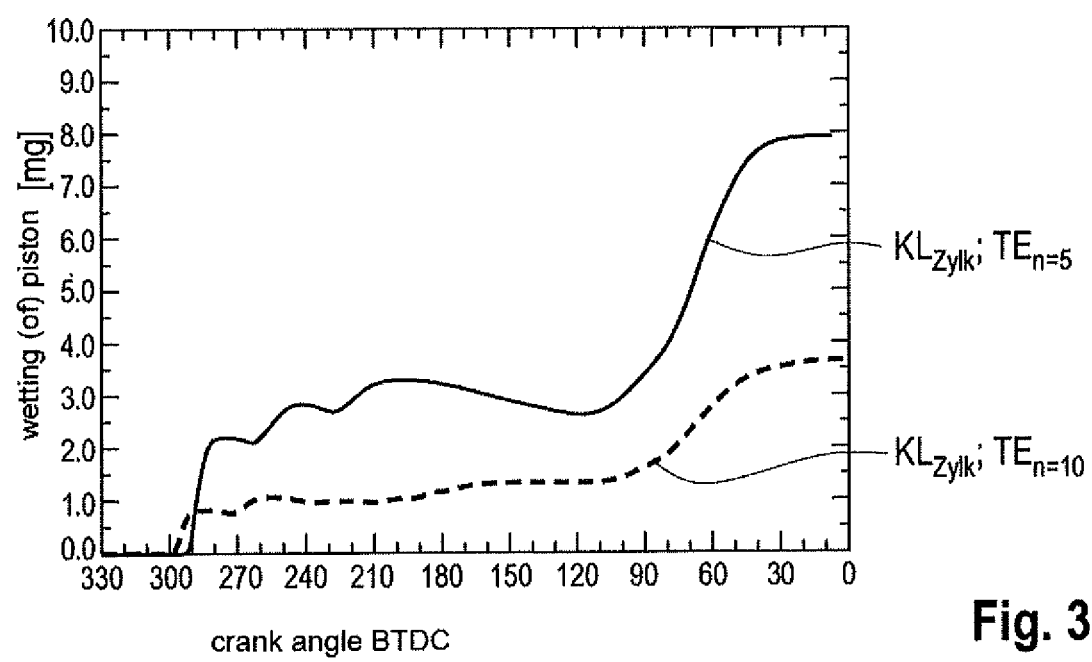
FIG. 3 is a diagram on whose abscissa the crank angle (in ° KW) is plotted, wherein on the ordinate the wetting of a piston surface (in mg) is plotted.

In an operation with the five partial injections $TE_{n=5}$ shown in FIG. 1, for example, there is a wetting (of the combustion chamber side surface) of the cylinder piston, which is shown analogous to FIG. 1 in the characteristic curve $KL_{Zylk}$ in FIG. 3 as a function of the position of the crankshaft in ° KW.

As FIG. 1 further clarifies, it is provided that during a duty cycle within the intake and compression phase more partial injections $TE_n$ are made than before, wherein it is provided that at different injection times, which are parametrized in a map, several partial injections $TE_n$, in the embodiment up to ten partial injections $TE_{n=10}$, are distributed to the intake and compression phase.

It is provided that according to FIG. 1, in the specified exemplary operating point BP, initially five partial injections $TE_{n=5}$; $TE_1$, $TE_2$, $TE_3$, $TE_4$, $TE_5$ are provided, wherein the injection times are parametrized in a map. It is provided that five partial injections $TE_{1-5}$; $TE_1$, $TE_2$, $TE_3$, $TE_4$, $TE_5$ made at predetermined crank angles ° KW between 300° KW and 260° KW in the intake phase in an early injection bundle according to the invention as a function of the operating point, wherein an equally long—not changing—interval time ΔP between the individual partial injections $TE_{n=5}$ of, for example ΔP=1.5 ms, is provided.

It is further provided that according to FIG. 1, in the specific exemplary operating point BP, five further partial injections $TE_{6-10}$; $TE_6$, $TE_7$, $TE_8$, $TE_9$, $TE_{10}$ are provided, wherein the injection times are parametrized in a map. By way of example, it is provided that five partial injections $TE_{1-6}$; $TE_1$, $TE_2$, $TE_3$, $TE_4$, $TE_5$ are made at given crank angles KW in ° KW between 155° KW and 140° KW in the compression phase in a late injection bundle as a function of the operating point, wherein in turn an equally long—unchanged—interval time of ΔP between the individual partial injections $TE_{6-10}$ of, for example ΔP=1.5 ms, is provided.

In an operation with ten partial injections $TE_{n=10}$ shown in FIG. 1, for example, there is a wetting of the cylinder inner wall, which is shown in the characteristic curve $KL_{Liner}$ in FIG. 2 as a function of the position of the crankshaft in ° KW analogous to FIG. 1.

In an operation with ten partial injections $TE_{n=10}$ shown in FIG. 1, for example, a wetting of the cylinder piston results, which is shown in the characteristic curve $KL_{Zylk}$ in FIG. 3 as a function of the position of the crankshaft in ° KW analogous to FIG. 1.

Since there is a relatively low pressure in the combustion chamber, especially during the intake phase, there is a risk that the fuel injected into the combustion chamber by the fuel injector under high pressure collides with the wall of the combustion chamber opposite the fuel injector or the top of the piston and adheres there. Such a fuel application to the wall or the piston is difficult to evaporate and does not partake, or at least does not partake in the desired way, in the combustion in the combustion chamber, which increases fuel consumption and worsens the emission behavior.

The problem of the fuel depositing on a wall of the combustion chamber is—as mentioned—particularly striking when the wall of the combustion chamber is cold. In this case, the cold start behavior of the internal combustion engine is affected in a known manner.

In order to avoid such a deposit of fuel on a wall of the combustion chamber, in particular in cold operation, it is provided that the fuel injection valve is controlled by the control and regulation device so that it opens and closes as often as possible impulsively, that is, that as many partial injections as possible $TE_{n-max}$ are provided to keep the penetration depth of the fuel in the combustion chamber so low that the fuel no longer collides with the wall of the combustion chamber opposite the injector.

Due to this discontinuous fuel injection of the fuel by means of an optimized number n of the plurality n of individual injection pulses or partial injections $TE_n$ into the combustion chamber, the penetration depth of the fuel into the combustion chamber is reduced. The risk of the fuel depositing on the wall of the combustion chamber opposite the fuel injector or on the piston surface of the cylinder piston forming the combustion chamber is effectively reduced. This ensures that the fuel injected into the combustion chamber is present as completely as possible as an air-fuel mixture in the combustion chamber and thus an optimal combustion of the injected fuel takes place. This reduces fuel consumption and improves emission behavior, especially HC, NMHC and soot emissions. The reduced penetration depth of the fuel into the combustion chamber has a particularly favorable effect when the wall of the combustion chamber is cold, i.e., when the combustion engine starts cold.

It becomes clear that it is of great advantage to deliver the largest possible number n of partial injections $TE_n$, wherein so far, the approach has been as explained below.

Operating point-dependent operation is understood to be that in a characteristic map $K_{BP}$, as a function of the speed DRZ and the relative filling of a combustion chamber, a desired number n of partial injections $TE_n$ is specified as a fixed operating point-dependent specification within parametrization in the characteristic map $K_{BP}$. The total fuel mass to be injected per duty cycle is known to depend on the relative filling of the combustion chamber, i.e., on the air mass that enters the combustion chamber. Taking into account lambda $\lambda=1$ as a function of the relative filling in %, the total fuel mass to be injected per duty cycle is divided into a desired number n of partial injections $TE_n$, linear or non-linear, as a fixed operating point-dependent specification within the characteristic map $K_{BP}$.

Figure 4A:
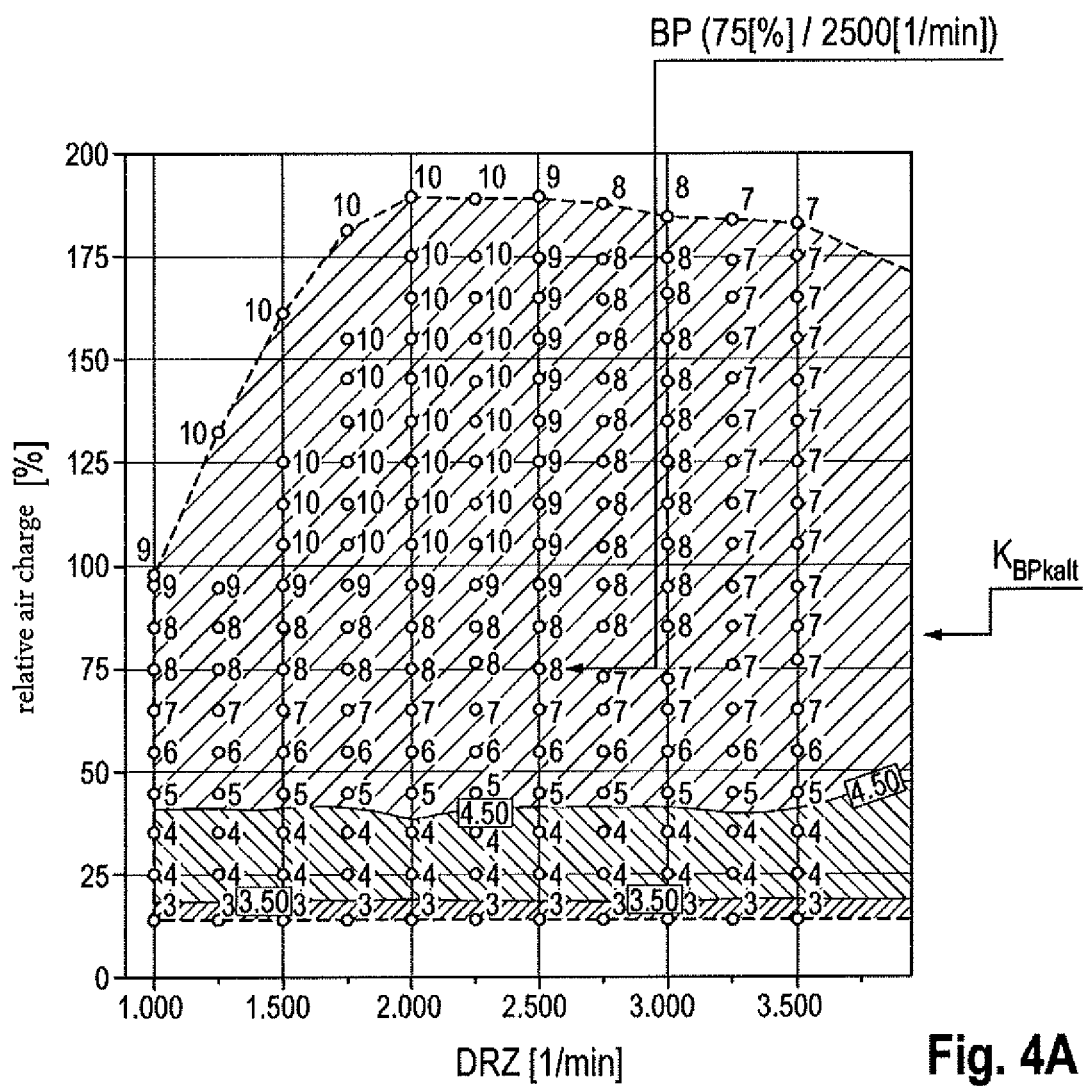
FIG. 4a is a diagram with a characteristic map ($K_{BPkalt}$) on whose abscissa the speed DRZ (in 1/min) of a crankshaft is plotted, while on the ordinate the filling of a combustion chamber (in %) is plotted, wherein the characteristic map ($K_{BPkalt}$) illustrates an operating point-dependent operation of the internal combustion engine in cold operation.

The described operating point-dependent operation is then illustrated in more detail by means of FIG. 4A using an example in cold operation of the internal combustion engine.

In a diagram, FIG. 4A shows a characteristic map $K_{BPkalt}$ on whose abscissa the speed DRZ in 1/min of a crankshaft is plotted, while on the ordinate the filling of the combustion chamber is plotted in %, wherein the characteristic map $K_{BPkalt}$ illustrates an operating point-dependent operation of the internal combustion engine in cold operation. In other words, the characteristic map $K_{BPkalt}$ or the section of the characteristic map illustrates an operating point-dependent operation of the exemplarily selected internal combustion engine with a displacement of 1.0 l and a rated power of 85 KW (pressure in the rail 350 bar) in cold operation in which the number of partial injections $TE_n$ is parametrized.

In FIG. 4A, the diagram of the characteristic map $K_{BPkalt}$ illustrates in which operating points BP of said internal combustion engine ten partial injections $TE_{1-10}$ can be made in cold operation analogous to FIG. 1.

Within the characteristic map $K_{BPkalt}$, as illustrated by one of the other exemplary operating points BP with a filling of the combustion chamber of 75% and a speed DRZ of 2500 in 1/min (pressure in the rail 350 bar), eight partial injections $TE_{n=8}$ are specified as a function of the operating point.

In other words, the map specification in the exemplary cold operating point 75(%)/2500(1/min) leads to the fact that only eight partial injections $TE_{n=8}$ are made, which are distributed according to FIG. 1 to a duty cycle in a preferred design into early and late bundles.

This means that this map specification, in an exemplary other operating point BP of the map $K_{BPkalt}$ deviating from the number of partial injections $TE_{n=10}$, has only eight partial injections $TE_{n=8}$ in the operating point filling=75% and speed DRZ=2500 in 1/min. This is due to the fact that at this operating point BP, for example, the maximum desired number of ten partial injections $TE_{n-max=10}$ cannot be realized due to the operating point-dependent total injection mass $m_{Ges}$ by means of ten partial injections $TE_{n=10}$, taking into account a minimum possible opening time $t_{min}$=of the fuel injector which cannot be undercut and a given constant interval time $\Delta P$, as will be further explained below.

In the case of a fuel injector, the minimum possible, i.e., available opening time $t_{min}$ of the fuel injector is $t_{min}=t_{oe}+t_{as}+t_s$. This time $t_{min}$ cannot be undercut.

In this case, $t_{min}$ is the minimum opening time of the switching valve and $t_{oe}$ is the opening time, $t_{as}$ is the time at the stroke stop and $t_s$ is the closing time.

The longer the time $t_{min}$, the more mass (fuel mass) is taken from the control chamber of the fuel injector and the greater the fuel injection mass of the fuel injector, which is injected into the combustion chamber by adjusting an injector needle controlled by the switching valve by the fluid pressure in the control room.

This also means that the minimum possible opening time $t_{min}$ of the fuel injector, taking into account the rail pressure, is assigned a critical mass threshold $m_{krit}$, which cannot be undercut in terms of a certain critical mass $m_{krit}$ per partial injection $TE_n$. In other words, an even smaller injection mass than $m_{krit}$ per partial injection $TE_n$ cannot be put through by the fuel injector.

Each fuel injector has a known injector specification, that is, without taking into account operationally relevant influences (such as aging, etc.), $t_{min}$ is known as the minimum opening time $t_{min}$ of the fuel injector and the associated injector-specific critical mass threshold $m_{krit}$.

According to the invention, the approach is as follows:

With the aim of realizing the largest possible number $TE_{n\text{-}max}$ of partial injections $TE_n$, in any operating mode (cold or warm operation) of the internal combustion engine, but in particular in cold operation, it is provided according to the invention, as a function of the minimum opening time $t_{min}$ of the fuel injector, to determine the maximum possible number of partial injections $TE_{n\text{-}max}$ taking into account the total fuel mass $m_{Ges}$ to be injected and taking into account that in certain operating states the critical mass threshold $m_{krit}$ of the fuel injector is not undercut.

By means of the previous approach on the basis of characteristic maps $K_{BPkalt}$ (see FIG. 4A) or $K_{BPwarm}$ (see FIG. 5A) that are exclusively operating point-dependent, this highest possible number n-max of partial injections $TE_{n\text{-}max}$ is not optimally achieved, since the parametrization of the maps with regard to the number of partial injections $TE_n$ is decided exclusively on the basis of the relative filling and the speed DRZ in the respective operating point BP and the associated determined total injection mass $m_{Ges}$ and is fixed by the parametrization of the respective characteristic map $K_{BP}$.

In other words, lambda target jumps which, starting from stoichiometric operation $\lambda=1$, are deviated from by operating states a) cold start (start adaptation), b) catalytic converter diagnosis (parallelization) or c) catalytic converter purging or d) component protection events and in which a change in the total fuel mass $m_{Ges}$ per duty cycle is caused, unfortunately are not taken into account in the operating point-dependent approach with regard to the maximum possible number n of partial injections $TE_{n\text{-}max}$.

A further problem occurs in the operating point-dependent approach, which is to be solved by the invention. The problem is that with a change in the total fuel mass to be injected $m_{Ges}$ per duty cycle and with the same number n of partial injections $TE_n$ and unchanged interval times $\Delta P$ between the partial injections $TE_n$, due to lambda jumps, there is a risk that a critical state arises within the operating point-dependent characteristic map which is caused by the fact that the fuel injector injects a fuel mass that is too low due to its minimum possible opening time $t_{min}$ at a specified number n of partial injections $TE_n$ per partial injection in the operating point-dependent characteristic map, if the total fuel mass $m_{Ges}$ per duty cycle is reduced by a certain amount, for example in lean-burn operating conditions or in other operating conditions.

In other words, if, for example, in an operating point-dependent addressing of the target injection number $TE_{n\text{-}Soll\text{-}BP}$ in the operating point-dependent characteristic map, for example, six partial injections $TE_{n=6}$ (see in advance FIG. 6A) are provided, it may be that if there is no change in the injection number n=6 due to a reduced total fuel mass $m_{Ges}$ of the fuel to be injected, the critical mass threshold $m_{krit}$ of the fuel injector is undercut. This is due to the fact that the reduced total fuel mass $m_{Ges}$, taking into account the minimum possible opening time $t_{min}$ of the fuel injector, has already been completely injected after, for example, five partial injections $TE_{n=5}$. That is, at least one of the six partial injections $TE_{n=6}$ cannot be injected, whereby the fuel distribution explained in connection with FIG. 1 is unfortunately not carried out in the desired manner.

As mentioned earlier, the internal combustion engine comprises a control and regulation device to which a user's output requirement is communicated by a fuel pedal so that an operating point-dependent fuel mass is transmitted to the control and regulation device.

If, as a function of the respective operating point BP, an increased or decreased fuel mass occurs in the described operating states, the total injection mass $m_{Ges}$ to be observed changes. An exclusively operating point-dependent parametrization of the total injection mass $m_{BP}$ does not take into account the total injection mass $m_{Ges}$ changed due to the named operating states.

For this reason, the invention provides that in the control and regulation device to which the output requirement is transmitted, no operating point-dependent total injection masses $m_{BP}$ are transmitted, but instead only mass-based total injection masses $m_{Ges}$ are calculated and determined, as explained below.

In accordance with the output requirement, a mass-based operation is understood to mean that a certain total injection mass $m_{Ges}$ is desired or specified for each duty cycle. As a function of the air mass supplied to the combustion chamber, the determined total injection mass $m_{Ges}$ is added to the supplied air mass, taking into account a predetermined lambda value $\lambda$, wherein it is provided that before the actual injection, it is always verified "automatically" and "continuously" as to which number n of partial injections $TE_n$—as a function of $m_{krit}$ and the desired specified total fuel mass $m_{Ges}$ to be injected—per duty cycle is maximally possible. Subsequently, the injection of the total injection mass $m_{Ges}$ always takes place in the maximum possible number n of partial injections $TE_{n\text{-}max}$, wherein the total injection mass $m_{Ges}$ is distributed mass-based to the partial injections $TE_n$, the individual partial injections $TE_n$, linearly or non-linearly, taking into account a non-undercutting of $m_{krit}$. The goal is to never fall below the critical mass threshold $m_{krit}$, taking the rail pressure into account.

Figure 4B:
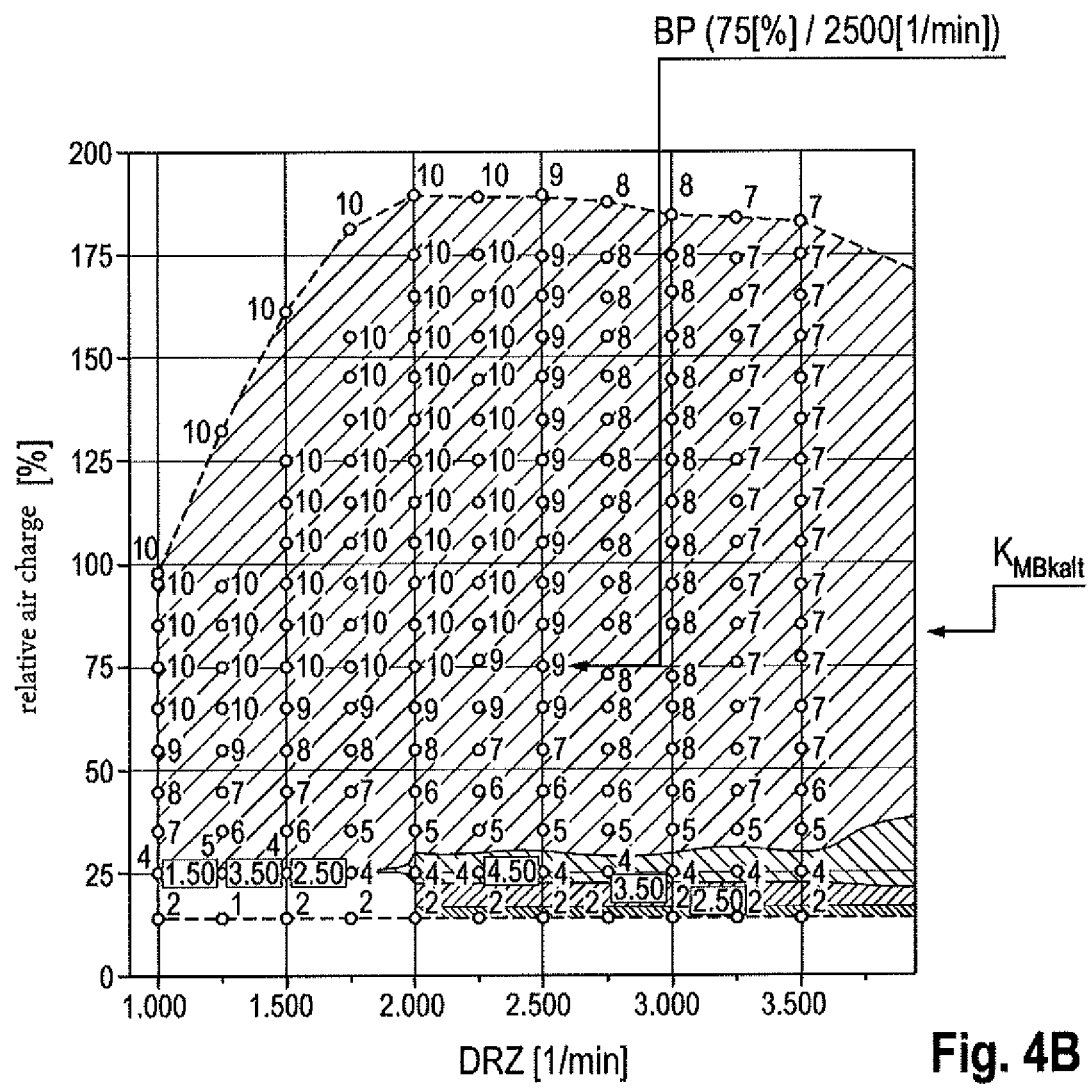
FIG. 4b is a diagram with a characteristic map ($K_{MBkalt}$) on whose abscissa the speed DRZ (1 min) of a crankshaft is plotted, while on the ordinate the filling of a combustion chamber (in %) is plotted, wherein the characteristic map ($K_{MBkalt}$) illustrates an operation of the internal combustion engine in cold operation.

A total mass $m_{Ges}$ to be injected is assigned, for example in cold operation, in the mass-based map $K_{MBkalt}$ according to FIG. 4B to a certain output requirement in an operating point BP. By means of this assignment, for example, a "cold start adaptation" can be carried out, so that deviating from the operating point-dependent operation, an increased total injection mass $m_{Ges}$ is injected within the cold start adaptation.

This specification is transmitted via the control and regulation device and taken into account by the mass-based approach in an advantageous manner by increasing the total injection mass $m_{Ges}$ and then proceeding as explained above. This means that according to the increased total injection mass $m_{Ges}$ formed by the output requirement and the cold start adaptation, the determined total injection mass $m_{Ges}$, now increased by the cold start adaptation, is specified for each duty cycle in the mass-based operation. As a function of the air mass supplied to the combustion chamber, this increased total injection mass $m_{Ges}$ due to cold start is added to the supplied air mass, taking into account a predetermined lambda value $\lambda$, wherein it is provided that before the actual injection, it is always "automatically" and "continuously" verified as to which number n of partial injections $TE_n$—as a function of $m_{krit}$ and the desired total fuel mass $m_{Ges}$ to be injected increased due to cold start—per duty cycle is maximally possible. Subsequently, the injection of the total injection mass $m_{Ges}$ always takes place in the maximum possible number n of partial injections $TE_{n\text{-}max}$, wherein the total injection mass $m_{Ges}$ is distributed mass-based to the partial injections $TE_n$, the individual partial injections $TE_n$, linearly or non-linearly, also taking into account a non-undercutting of $m_{krit}$.

In each duty cycle, a value for the maximum available total opening time $\Delta t_{Ges}$ of the fuel injector is available for the injection of the total injection mass $m_{Ges}$ in the n partial injections $TE_n$ if the total injection mass $m_{Ges}$ is injected in a single injection n=1. This total opening time $\Delta t_{Ges}$ is, according to the prerequisites explained above, distributed mass-based into a maximum possible number n of partial injections $TE_{n-max}$ with several partial opening times, taking into account a failure to undercut $m_{krit}$, so that the target injection number $TE_{n-Soll-MB}$ is available in the control and regulation device and is subsequently implemented as the actual injection number $TE_{n-Ist-MB}$.

It is proceeded in such a way that the respective (current) total injection mass $m_{Ges}$ is divided into equal (linear) or non-equal (non-linear) fuel masses m per partial injection $TE_n$, taking into account constant or changeable predetermined interval times $\Delta P$ and the critical mass threshold $m_{krit}$, whereby the maximum possible number n of partial injections $TE_{n-max}$ is calculated which is then available in the control and regulation device as a verified target injection number $TE_{n-soll-MB}$ and is subsequently implemented as the actual injection number $TE_{n-Ist-MB}$.

The advantage is illustrated by FIG. 4B. By comparing the largest possible number of partial injections $TE_{n-max}=9$ in the operating point 75(%)/2500(1/min), determined mass-based in FIG. 4B with the same operating point 75(%)/2500 (1/min) in FIG. 4A, it becomes clear that of the total injection mass $m_{Ges}$ to be injected as a function of the minimum opening time $t_{min}$ of the injector, known from the injector specification and the predetermined equally distributed equal interval times $\Delta P$ between the individual partial injections $TE_n$, due to the mass-based calculation, up to nine $TE_{n-max}=9$ instead of the previous (see FIG. 4A) eight partial injections $TE_{n=8}$ can be injected, which in the conventional operating point-dependent approach are specified in the characteristic map $K_{BPkalt}$.

By this increase in the number of partial injections, in this embodiment n+1, the desired advantages already explained with regard to the optimal combustion of the injected fuel and with regard to the reduction of fuel consumption and the improvement of the emission behavior, in particular the HC, NmHC and soot emissions, especially in cold operation (cold start) of the internal combustion engine, are achieved.

Figure 5A:
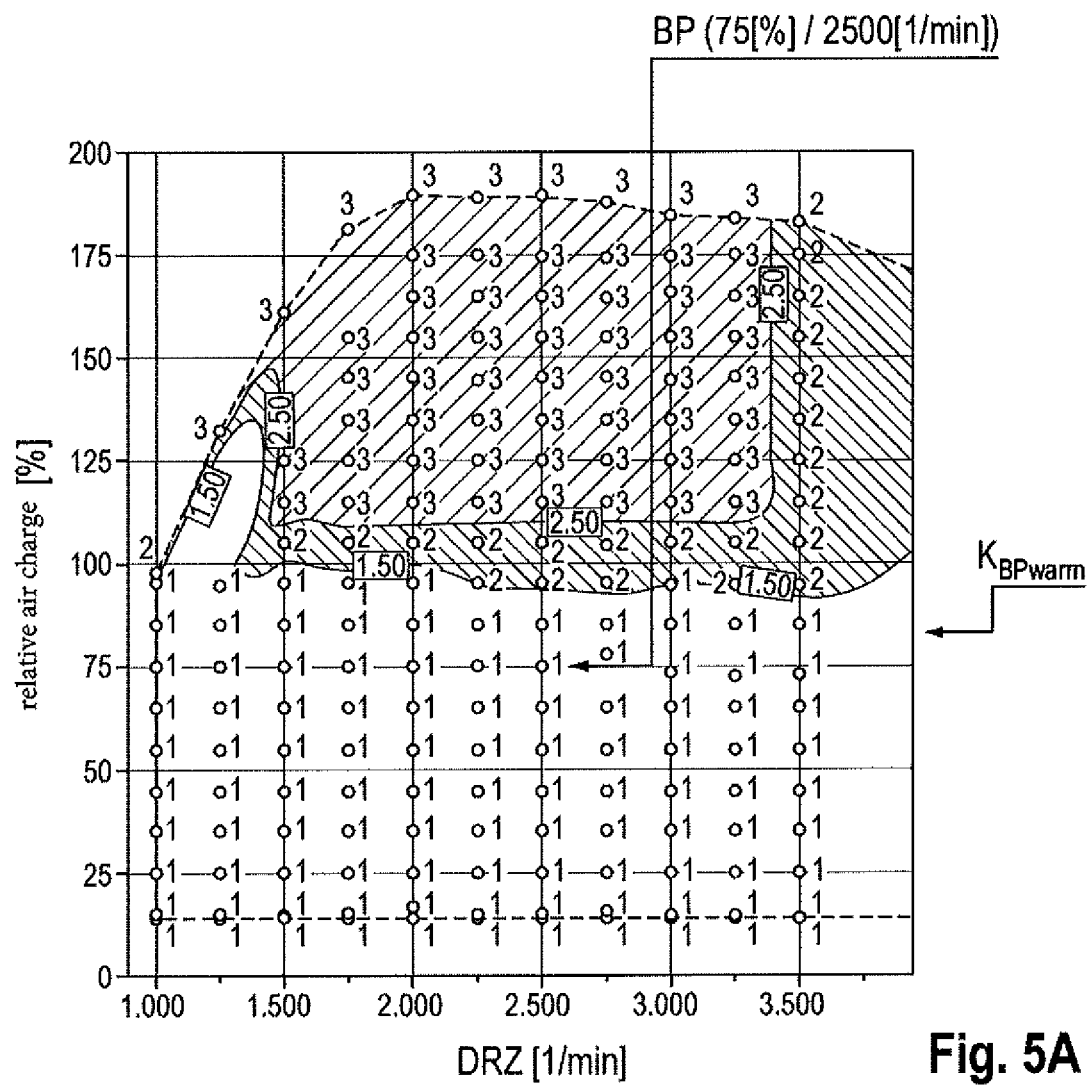
FIG. 5a is a diagram with a characteristic map ($K_{BPwarm}$) on whose abscissa the speed DRZ in (1/min) of a crankshaft is plotted, while on the ordinate the filling of a combustion chamber (in %) is plotted, wherein the characteristic map ($K_{BPwarm}$) illustrates an operating point-dependent operation of the internal combustion engine in warm operation.
Figure 5B:
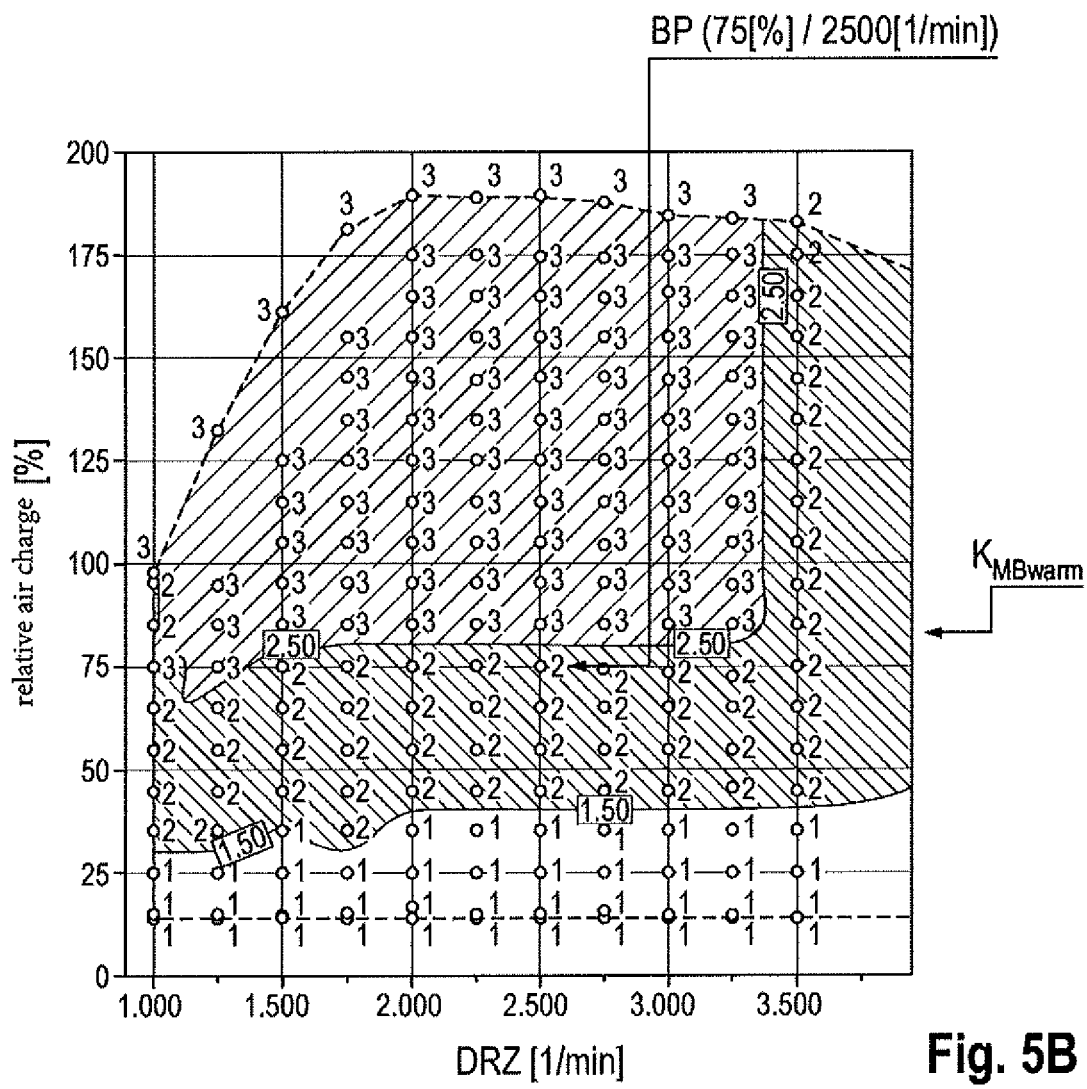
FIG. 5b is a diagram with a characteristic map ($K_{MBwarm}$) on whose abscissa the speed DRZ in (1/min) of a crankshaft is plotted, while on the ordinate the filling of a combustion chamber (in %) is plotted, wherein the characteristic map ($K_{MBwarm}$) illustrates a mass-based operation of the internal combustion engine in warm operation.

This approach is also illustrated by FIGS. 5A and 5B.

FIG. 5A shows a diagram with a characteristic map $K_{BPwarm}$ on whose abscissa the speed DRZ in 1/min of a crankshaft KW is plotted, while on the ordinate the relative filling of a combustion chamber in % is plotted, wherein the characteristic map $K_{BPwarm}$ illustrates an operating point-dependent operation of the internal combustion engine in warm operation.

FIG. 5B shows a diagram with a characteristic map $K_{MBwarm}$ on whose abscissa the speed DRZ in 1/min of a crankshaft KW is plotted, while on the ordinate the filling of a combustion chamber in % is plotted, wherein the characteristic map $K_{MBwarm}$ illustrates a mass-based operation and calculation of the largest possible number of partial injections $TE_{n-max}$ of the internal combustion engine in warm operation.

According to FIGS. 5A and 5B, a distinctive feature is clarified, which is in that in the mass-based operation, with the aim of determining the largest possible number of $TE_{n-max}$ of partial injections $TE_n$, a threshold specification is taken into account in which $TE_{n-max}$ should be $\le/=3$). This means that with regard to the maximum number of $TE_{n-max}$ of the partial injections in warm operation, as explained above, the respective (current) total injection mass $m_{Ges}$ is divided into equally large, injected fuel masses m per partial injection $TE_n$, taking into account the constant predetermined interval time $\Delta P$ and the critical mass threshold $m_{krit}$, whereby the maximum possible number n of partial injections $TE_{n-max}$ is calculated. If the calculated value $TE_{n-max}$ is >3, the number of partial injections $TE_n$ is set to the maximum value n=3.

This means that in the control and regulation device, only verified target injection numbers $TE_{n-soll-MB}=1$, 2 or 3 are processed in warm operation according to the mass-based characteristic map $K_{MBwarm}$ and injected as partial injections $TE_n$ as actual injection numbers $TE_{n-Ist-MB}$.

The advantage of the mass-based approach is illustrated by FIG. 5B. By comparing the largest possible number of partial injections $TE_{n-max}=2$ in FIG. 5B, determined mass-based at the operating point 75(%)/2500(1/min) with the same operating point 75(%)/2500(1/min) in FIG. 5A, it becomes clear that of the total injection mass $m_{Ges}$ to be injected as a function of the minimum opening time $t_{min}$ of the injector known from the injector specification and the predetermined equally distributed equal interval times $\Delta P$ between the individual partial injections $TE_n$, due to the mass-based calculation, up to two $TE_{n-max}=2$ instead of the previous (see FIG. 5A) only one partial injection $TE_{n=1}$ can be injected, which in the conventional operating point-dependent approach are specified in the characteristic map $K_{BPkalt}$.

By a mass-based operating mode, it is thus advantageously possible that not only output-related parameters such as the desired torque are taken into account, because in the operation of the internal combustion engine, operating states such as catalytic converter purging of the exhaust system, in which the fuel mass, regardless of the output requirement of the user, is increased by pressing the accelerator pedal, can also occur. This increases the desired total fuel mass to be injected in the respective duty cycle, i.e., the total injection mass $m_{Ges}$, which is taken into account by the mass-based operation in the characteristic maps $K_{MBkalt}$ (see FIG. 4B) and $K_{MBwarm}$ (see FIG. 5B).

By means of a mass-based operation, it is advantageously possible that regardless of the cold or warm exemplary load-dependent operating point 75(%)/2500(1/min), it can be operated via a load-independent adjustment of the total injection mass $m_{Ges}$ to be injected in the respective characteristic map $K_{MBkalt}$ (see FIG. 4B) or $K_{MBwarm}$ (see FIG. 5B) richer—with more fuel—or leaner—with less fuel.

This determination always takes into account whether the maximum possible number of $TE_{n-max}$ of partial injections $TE_n$, determined as a function of the specified total injection mass $m_{Ges}$ to be injected in the characteristic maps $K_{MBkalt}$ or $K_{MBwarm}$, can also be realized within a maximum total time $\Delta t_{Ges}$ available for injection.

Figure 6A:
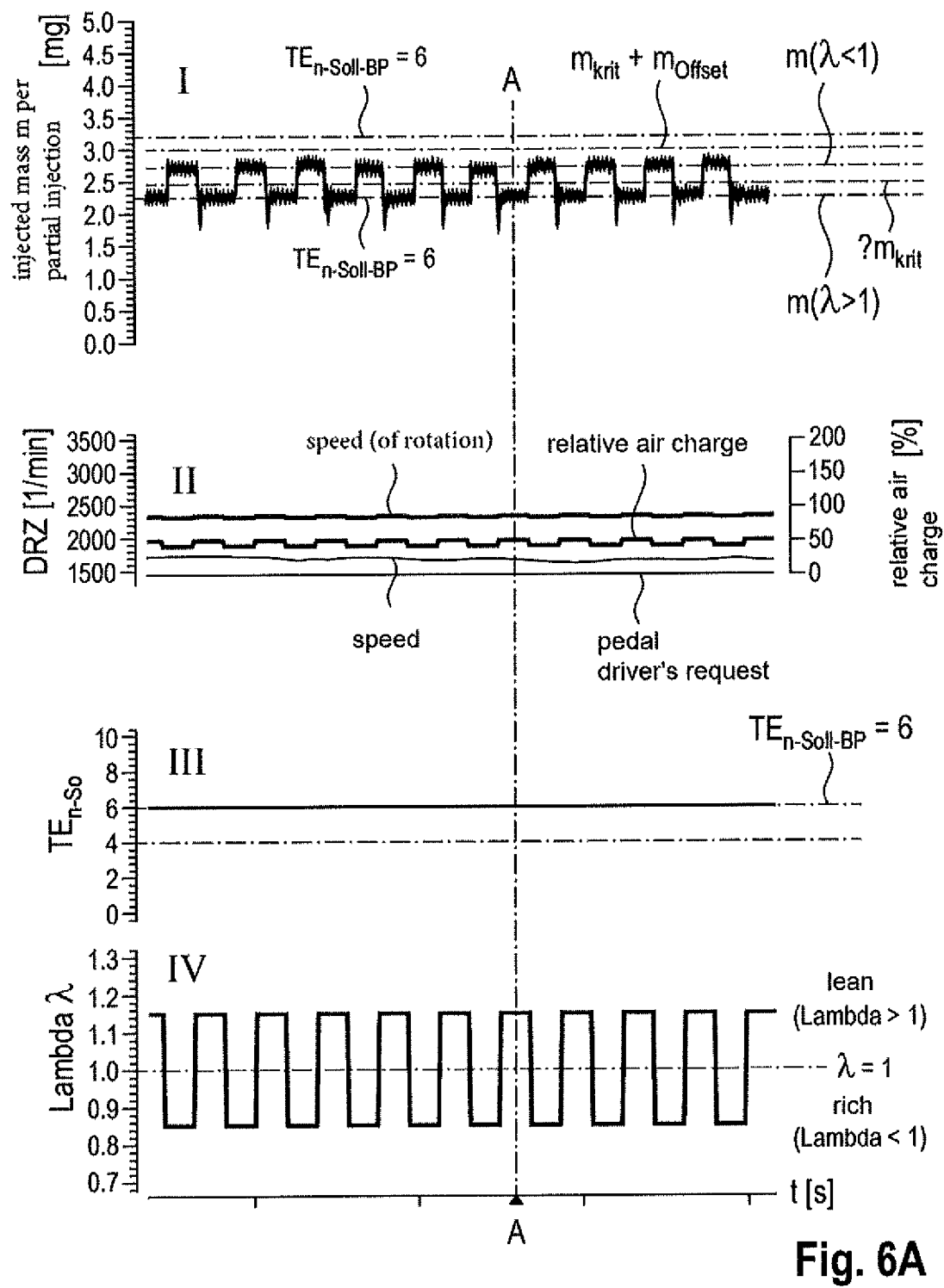
FIG. 6a shows diagrams I, II, III, IV with operating parameters (ordinate) over the time t (abscissa) on a figure of an operating point-dependent addressing of a target injection number $TE_{n\text{-}Soll\text{-}BP}$ wherein in diagram I, the injected partial fuel mass m per partial injection $TE_{n=6}$ and in diagram II, the speed, the relative filling of the combustion chamber, the speed of the vehicle with the internal combustion engine and the load of the vehicle (driver's request, pedal) and in diagram III, the number n of partial injections $TE_{n=6}$ according to the operating point-dependent target injection number and in diagram IV, the lambda value λ are shown.

FIG. 6A shows diagrams I, II, III, IV with operating parameters (ordinates) over the time t (abscissa) on a figure of an operating point-dependent addressing of a verified target injection number $TE_{n-Soll-BP}$.

Diagram I shows the injected mass m per partial injection with six partial injections $TE_{n=6}$.

In diagram II, the characteristic curves speed with associated scaling, the relative filling of the combustion chamber with associated scaling and the speed of the vehicle without associated scaling (constant>0) and the driver's request (pedal=constant>0) are also shown without scaling.

Diagram III shows the number n of partial injections $TE_{n=6}$ according to the operating point-dependent target injection number $TE_{n-Soll-BP}=6$.

Diagram IV shows the lambda value λ, which forms the basis for the characteristic curves shown in diagrams I to III.

The vertical line A in the figure shows that in lean-burn operation λ>1 according to diagram IV, with unchanged operating point-dependent target injection number $TE_{n\text{-}Soll\text{-}BP}=6$ according to diagram III and constant operation of the internal combustion engine according to diagram II, the injected fuel mass m per partial injection $TE_n$, at the specified target injection number $TE_{n\text{-}Soll\text{-}BP}=6$ possibly disadvantageously reaches the critical mass threshold ?$m_{krit}$ of the fuel injector, as illustrated at the intersection of line A at the lowest amount of mass m per partial injection $TE_n$ in diagram I.

The total mass $m_{Ges}$ to be injected in this case is so small due to the lambda jump to $\lambda>1$ clarifying the invention that the associated fuel mass can no longer be safely injected within six partial injections $TE_{n=6}$ because of $t_{min}$, the minimum possible opening time $t_{min}$ of the fuel injector.

This problem is eliminated by the inventive approach, as explained below.

Figure 6B:
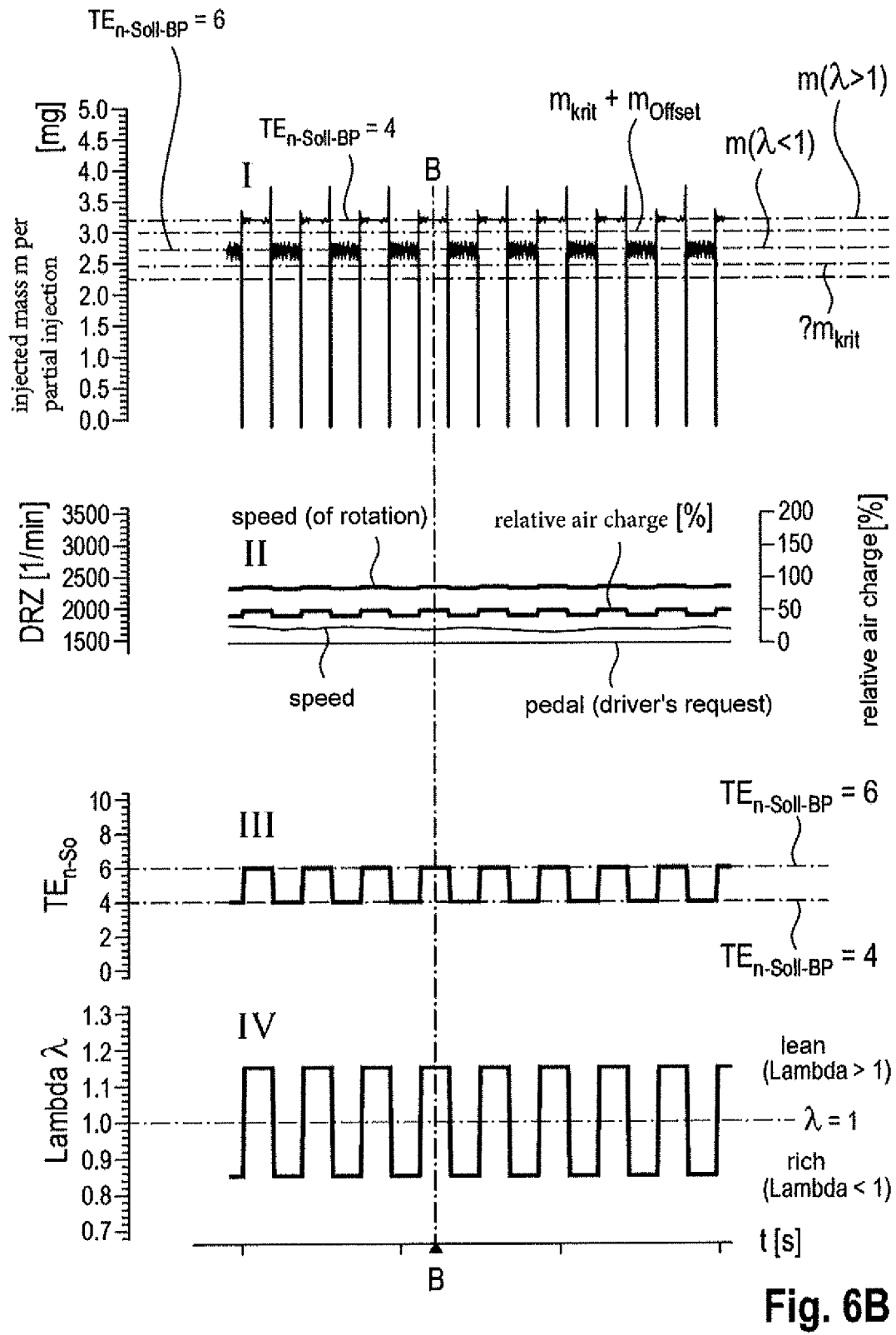
FIG. 6b shows the diagrams I, II, III, IV with operating parameters (ordinate) over the time t (abscissa) on a figure at an operating point-dependent addressing of a target injection number $TE_{n\text{-}Soll\text{-}BP}$ according to FIG. 6A with verification of the maximum permissible number n of partial injections $TE_{n\text{-}max}$ with mass-based switching of the target injection number $TE_{n\text{-}Soll\text{-}MB}=6$ to the mass-based target injection number $TE_{n\text{-}Soll\text{-}MB}=4$ due to possible undercutting of a critical mass threshold $m_{krit}$ of the minimum possible opening time $t_{min}$ of the fuel injector, wherein in diagram I, the injected fuel mass m per partial injection $TE_{n=4}$ after the mass-based switching of the target injection number $TE_{n\text{-}Soll\text{-}MB}=6$ to the target injection number $TE_{n\text{-}Soll\text{-}MB}=4$ and in diagram II, the speed, the relative filling of the combustion chamber, the speed of the vehicle with the internal combustion engine and the load of the vehicle (driver's request, pedal) and in diagram III, the number n of partial injections $TE_{n=6}$ and $TE_{n=4}$ according to the mass-based target injection numbers and in diagram IV, the lambda value λ are shown.

FIG. 6B shows diagrams I, II, III, IV with operating parameters (ordinate) over the time t (abscissa) shown on a figure in an operating point-dependent addressing of a target injection number $TE_{n\text{-}Soll\text{-}BP}$ according to FIG. 6A, with verification of the maximum permissible number n of partial injections $TE_n$, with mass-based switching of the verified target injection number $TE_{n\text{-}Soll\text{-}MB}=6$ to the mass-based verified target injection number $TE_{n\text{-}Soll\text{-}MB}=4$, due to possibly undercutting the critical mass threshold $m_{krit}$ achieved by the minimum possible opening time $t_{min}$ of the fuel injector.

Diagram I shows the injected fuel mass m per partial injection $TE_{n=4}$ after the mass-based switching of the verified target injection number $TE_{n\text{-}Soll\text{-}MB}=6$ to the verified target injection number $TE_{n\text{-}Soll\text{-}MB}=4$.

In diagram II, the characteristic curves speed with associated scaling, the relative filling of the combustion chamber with associated scaling and the speed of the vehicle without associated scaling (constant>0) and the driver's request (pedal=constant<0) are also shown without scaling.

Diagram III shows the number n of partial injections $TE_{n=6}$ and $TE_{n=4}$ according to the mass-based n target injection numbers target injection number $TE_{n\text{-}Soll\text{-}MB}=6$ and verified target injection number $TE_{n\text{-}Soll\text{-}MB}=4$.

Diagram IV shows the lambda value $\lambda$, which forms the basis for the characteristic curves shown in diagrams I to III.

The vertical line B in the figure illustrates that in lean burn operation $\lambda>1$ according to diagram IV according to diagram III, the mass-based verified target injection number $TE_{n\text{-}Soll\text{-}MB}=6$ is switched to the verified target injection number $TE_{n\text{-}Soll\text{-}MB}=4$.

In diagram II it becomes clear that the constant operation of the internal combustion engine corresponds to diagram II, i.e., the load specified by the driver has not changed.

Since the injected fuel mass m per partial injection $TE_n$ at the specified target injection number $TE_{n\text{-}Soll\text{-}BP}=6$ reaches the critical mass threshold value ?$m_{krit}$ of the fuel injector according to diagram I in a disadvantageous manner, the number n of partial injections TEn is reduced to the target injection number $TE_{n\text{-}Soll\text{-}MB}=4$. See diagram III at the intersection with line B.

This increases in the desired manner the injected fuel mass m per partial injection $TE_n$ at $TE_{n\text{-}Soll\text{-}MB}=4$, as illustrated in diagram I at the intersection with line B, so that the risk of a possible undercutting of $m_{krit}$ as a function of the minimum possible opening time $t_{min}$ of the fuel injector no longer exists.

In the embodiment, due to the large amount of the lambda jump selected for clarification, the verified target injection number $TE_{n\text{-}Soll\text{-}MB}=6$ is lowered to $TE_{n\text{-}Soll\text{-}MB}=4$ by the number n–2.

The principle applies that in the control and regulation device, according to the above calculation of the possible mass-based verified target injection number $TE_{n\text{-}Soll\text{-}MB}$, n−1 or n+1, switching is carried out for mass-based adjustment of the verified target injection number $TE_{n\text{-}Soll\text{-}MB}$. In the embodiment, the reduction of the verified injection number $TE_{n\text{-}Soll\text{-}MB}=6$ to $TE_{n\text{-}Soll\text{-}MB}=4$ has thus been carried out in quick succession in the control and regulation device by two switchings n−1 carried out in quick succession. This tiered mass-based switching cannot be seen in FIG. 6B.

Figure 7A:
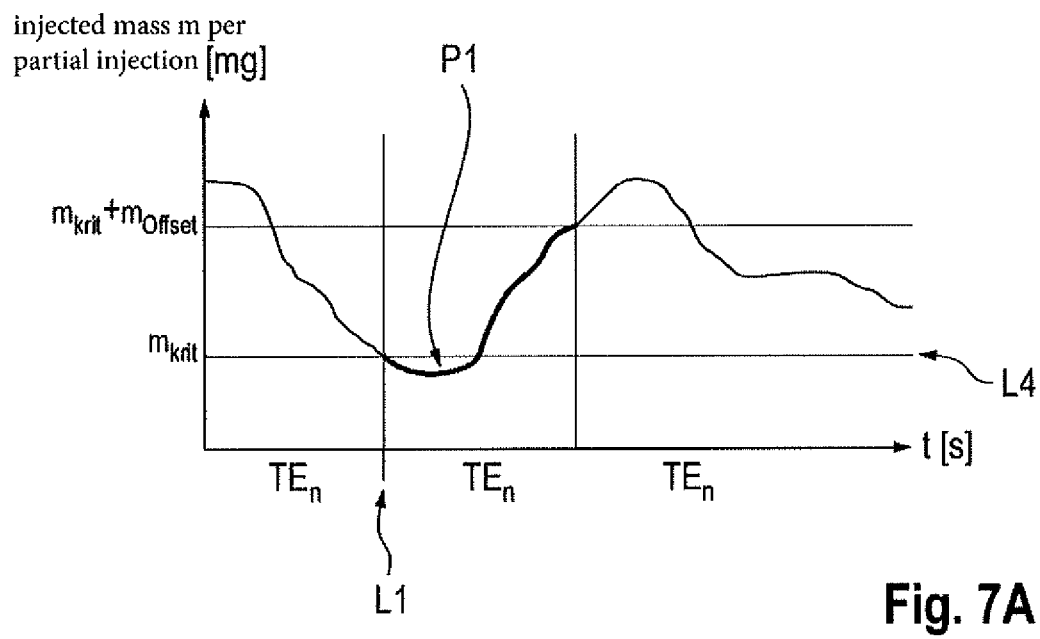
FIG. 7a is a diagram of a specified fuel mass to be injected of a partial injection $TE_n$ within the number n of partial injections $TE_n$ (ordinate) specified in operating point-dependent operation over the time t (abscissa), with a critical mass threshold value $m_{krit}$ with a shortfall $m_{krit}$ in the operating point-dependent operation due to a lack of switching and the reaching of a critical range P1 of the at least one partial injection $TE_n$.

Finally, FIG. 7A shows a diagram with the injected fuel mass m of a partial injection $TE_n$ (ordinate) over the time t (abscissa) of a multiple injection with a critical mass threshold $m_{krit}$ of the fuel injector in the operating point-dependent operation.

Figure 7B:
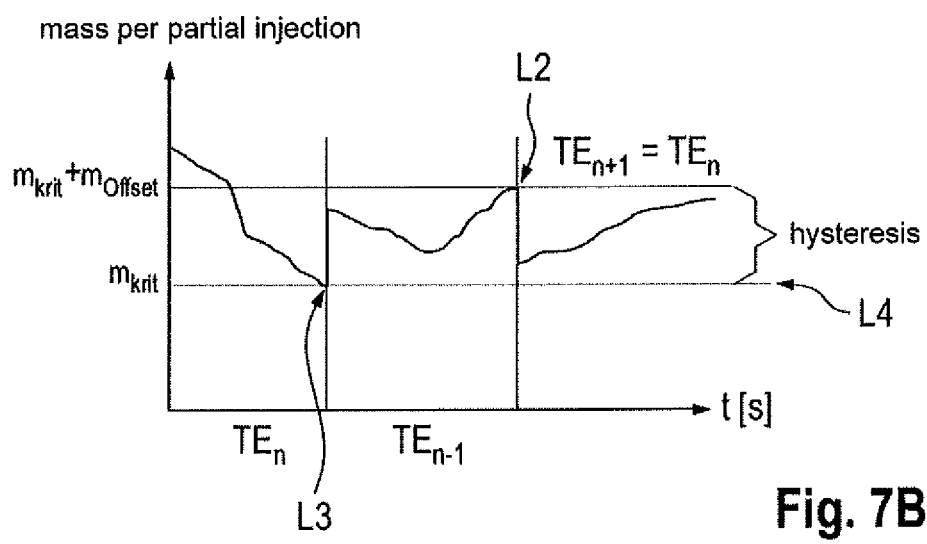
FIG. 7b is a diagram of the specified fuel mass to be injected according to a number n of partial injections $TE_n$ (ordinate) continuously calculated within the mass-based operation over the time t (abscissa) with the mass threshold $m_{krit}$ of the fuel injector critical in the mass-based operation, in which the specified mass per partial injection $TE_n$ is automatically increased in an advantageous manner by the mass-based switching $TE_{n-1}$ of the number n of partial injections $TE_n$ without falling below $m_{krit}$, and the number n is reduced, and with the mass threshold $m_{krit}+m_{offset}$, at which the specified mass per partial injection $TE_n$ is automatically reduced to the previous continuously calculated mass of partial injections $TE_n$ and the number n is increased again by the mass-based switching $TE_{n+1}$ of the partial injections $TE_n$.

In addition, a mass threshold $m_{krit}+m_{offset}$, in which the injection of the predetermined masses of all partial injections $TE_n$ of a multiple injection in the operating point-dependent and mass-based operations is by all means safely possible, is shown in FIG. 7A to illustrate the invention with respect to FIG. 7B.

In a multiple injection in a duty cycle, it is possible, for example, in six partial injections $TE_{n=6}$ analogous to FIG. 6A, that at least one partial injection $TE_n$ reaches a critical range P1 below $m_{krit}$ in an operating point-dependent addressing of the target injection number $TE_{n\text{-}Soll\text{-}BP}=6$ according to the arrow P1 if there is no change in the target injection number $TE_{n\text{-}Soll\text{-}BP}=6$ due to the injected mass of the fuel in six partial injections $TE_{n=6}$. The critical mass threshold $m_{krit}$ of the fuel injector is undercut, with the effect that at least one of the partial injections $TE_{n=6}$ is not injected or not reliably injected.

According to legend L1 in FIG. 7A, unfortunately there is no switching of $TE_{n\text{-}Soll\text{-}BP}$ with the critical mass $m_{krit}$.

It is a different situation according to the invention as shown in FIG. 7B.

This diagram again shows the injected fuel mass m per partial injection $TE_n$ (ordinate) over the time t (abscissa) with the mass threshold $m_{krit}$ of the fuel injector, which is critical in mass-based operation.

In addition, in FIG. 7B, analogously to FIG. 7A, the mass threshold $m_{krit}+m_{offset}$ is shown, in which the mass-based predetermined masses of all partial injections $TE_n$ of a multiple injection remain uncritical after switching to a higher number n of partial injections $TE_n$, as will be further explained below.

In a multiple injection in a duty cycle, it is no longer possible, for example, with six partial injections $TE_{n=6}$ analogous to FIG. 6B, that at least one partial injection $TE_n$ reaches a critical range P1 below $m_{krit}$ in a mass-based addressing of the target injection number $TE_{n\text{-}Soll\text{-}MB}=6$ as shown by the arrow P1.

What takes place in an advantageous manner is that before falling below the critical range P1, the target injection number $TE_{n\text{-}Soll\text{-}MB}=6$ is changed, that is, the target injection number $TE_{n\text{-}Soll\text{-}MB}=6$ in the embodiment (see FIG. 6, in particular I and III, line B) is reduced twice by n−1 to $TE_{n\text{-}Soll\text{-}BP}=4$. This means that the critical mass threshold $m_{krit}$ of the fuel injector is no longer undercut, with the effect that all of the partial injections are always injected as actual injection number $TE_{n\text{-}Ist\text{-}MB}=4$. If the critical mass threshold $m_{krit}$ is reached within a hysteresis, the target injection number $TE_{n\text{-}Soll\text{-}MB}$ is reduced.

If the mass threshold $m_{krit}+m_{offset}$ is reached again within the hysteresis between $m_{krit}$ and $m_{krit}+m_{offset}$, according to the invention the target injection number $TE_{n\text{-}Soll\text{-}MB}=4$ in the embodiment (see FIG. 6, in particular I and III) is again increased twice by n+1 to $TE_{n\text{-}Soll\text{-}MB}=6$ and injected as actual injection number $TE_{n\text{-}Ist\text{-}MB}=6$.

The hysteresis advantageously ensures that a switching back and forth between the threshold values $m_{krit}+m_{offset}$ and $m_{krit}$ takes place without leading to a permanent switching between the respective number n of partial injections $TE_{n=6}$.

According to legend L2 in FIG. 7B, a mass-based switching takes place at $m_{krit}+m_{offset}$ to $TE_n$-soil-MB, if at least one further injection n+1 is possible without undercutting the critical mass $m_{krit}$.

According to legend L3 in FIG. 7B, a mass-based switching from at least one partial injection $TE_n$ to n−1 of $TE_n$-soil-MB takes place before the critical mass $m_{krit}$ is reached.

The legend L4 in FIGS. 7A and 7B indicates the critical mass $m_{krit}$ below which opening of the injector is not guaranteed safely.

Lastly, a few embodiments of the aforementioned specific operating states, in which in particular lambda target jumps take place.

Starting from the stoichiometric operation λ=1, in these operating states a) cold start (start adaptation), b) catalytic converter diagnosis (parallelization) or c) catalytic converter purging or d) component protection events, stoichiometric operation λ=1 is deviated from, so that a change in the total fuel mass $m_{Ges}$ per duty cycle is achieved.

These operating states are taken into account using the inventive method of the "mass-based operation", as follows.

a) Cold Start (Start Adaptation):

For example, as already explained, on the basis of a required enriching of the air-fuel mixture in the start adaptation, the additionally required fuel mass is realized with an additional partial injection $TE_{n+1}$ after testing the mass-based switching in order to positively influence the homogenization of the air-fuel mixture in order to advantageously protect the internal combustion engine even better from fuel entry into the oil.

b) Catalytic Converter Diagnosis (Parallelization):

If the load-dependent operating point BP does not change and for other reasons there is an increased or decreased total injection amount $m_{Ges}$ in an operating state such as the catalytic converter diagnosis of the exhaust system, in which the amount of fuel is changed independently of the output requirement of the user, this operating mode "catalytic converter diagnosis" is hitherto unfortunately not taken into account in respect of the maximum possible number n of partial injections $TE_{n\text{-}max}$.

According to the invention it is provided that in the catalytic converter diagnosis, in a lean adjustment (see FIG. 6B, I to IV) of the air-fuel mixture and simultaneous maintaining of the operating point in the quasi-stationary state in an advantageous manner, taking into account the critical mass $m_{krit}$, a switching takes place, so that instead of n partial injections $TE_n$ at least one partial injection $TE_{n-1}$ less is injected.

In the case of rich adjustment (see FIG. 6B, I to V) of the air-fuel mixture, however, an increased total injection amount $m_{Ges}$ is required at the same quasi-stationary operating point, which takes place taking into account the critical mass $m_{krit}$ by switching, so that instead of n partial injections $TE_n$, at least one partial injection $TE_{n+1}$ is additionally injected.

c) Catalytic Converter Purging:

The air-fuel mixture is also enriched during catalytic converter purging. It is provided that in an advantageous manner, taking into account the mass-based switching, at least one additional partial injection $TE_{n+1}$ is carried out.

d) Component Protection Events:

For component protection reasons, the air-fuel mixture is also enriched. This enrichment leads in an advantageous manner, similar to catalytic converter purging and taking into account the mass-based switching, to at least one additional partial injection $TE_{n+1}$.

Torque Reserve:

Finally, it is provided as a further embodiment that, even if the air-fuel mixture has stabilized to a lambda value, but the internal combustion engine is operated in the torque reserve, such as idling, catalytic converter heating, particulate filter regeneration and coolant heating, the mass-based operation or its switching is used in an advantageous manner as a function of the efficiency deterioration of the engine by switching to at least one additional partial injection $TE_{n+1}$.

The present invention as a whole also relates to a computer program which is suitable for carrying out the above method when it is executed on a computer. It is particularly preferred if the computer program is stored in a memory. The present invention also relates to said control and/or regulation device for operating a combustion engine, in particular of a motor vehicle, in which the fuel is injected directly into a combustion chamber of the internal combustion engine. In order to optimize the operation of the internal combustion engine with regard to fuel consumption and emission behavior, it is proposed according to the invention that the control and/or regulation device for controlling and/or regulating the above method are suitable and are used. It is particularly preferred if the control and/or regulation devices are each provided with a computer program of the above-mentioned type. Lastly, the invention relates to an internal combustion engine having at least one combustion chamber and a device which injects the fuel directly into the combustion chamber. In order to improve the operating behavior of this internal combustion engine, in particular the fuel consumption, the emission behavior and the cold start behavior, it is provided according to the invention that the internal combustion engine is equipped with the control and/or regulation device.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an internal combustion engine of a motor vehicle, in which fuel is injected in a fuel injection device directly into a combustion chamber of the internal combustion engine in a plurality of time-spaced partial injections per duty cycle, the method comprising:
   determining a total injection mass per duty cycle into the combustion chamber as a function of an output requirement for the internal combustion engine as a function of an air mass supplied into the combustion chamber; and
   producing a fuel/air mixture, taking into account a predetermined air-fuel ratio, via the steps of:
      verifying a maximum possible number of partial injections per duty cycle as a function of a critical mass threshold of a fuel injector assigned to the respective combustion chamber, in which the fuel mass per partial injection is not undercut, and of the desired determined total fuel mass per duty cycle to be injected;
      determining a verified mass-based target injection number as a function of the verified maximum possible number of partial injections and distribution of the total fuel mass to the verified mass-based target injection number; and injecting the total fuel mass per duty cycle according to the verified mass-based target injection number with the fuel masses distributed to the partial injections, wherein a mass-based switching of the verified mass-based target injection number to a lower maximum possible verified target injection number is carried out due to an undercutting of the critical mass threshold, which is defined dependent on the rail pressure at a minimum possible opening time of the fuel injector, and determining a distribution of the total fuel mass over the lower maximum possible verified target injection number, and wherein a mass-based switching of the verified mass-based target injection number to a maximum possible verified target injection number is carried out due to an undercutting of the critical mass threshold, which is defined dependent on the rail pressure at a minimum possible opening time of the fuel injector, and determining a distribution of the total fuel mass over the maximum possible verified target injection number.

2. The method according to claim 1, wherein in a duty cycle within the intake and compression phase, several partial injections are injected on a mass-based basis, wherein at different injection times, several partial injections up to ten partial injections, are distributed in two injection bundles to the intake and compression phase.

3. The method according to claim 1, wherein the mass-based switching to the lower maximum possible verified target injection number of partial injections is carried out so that the critical mass threshold of at least one of the partial injections is not undercut in which the distribution of the total injection mass within the verified possible count of partial injections is possible.

4. The method according to claim 1, wherein the mass-based switching to the verified maximum possible number of partial injections is made when a mass threshold is reached, in which the distribution of the total injection mass within the verified maximum possible number of partial injections is safely possible.

5. The method according to claim 4, wherein a switching back and forth in a hysteresis takes place between the critical mass threshold and the mass threshold value.

6. The method according to claim 1, wherein the switching of the previously verified target injection number, starting from a stoichiometric operation of the internal combustion engine, is made in certain operating states including a) cold start (start adaptation) and/or a b) catalytic converter diagnosis (parallelization) and/or c) catalytic converter purging and/or a d) component protection event, wherein deviation is made from stoichiometric operation ($\lambda=1$) so that a change in the total fuel mass put through per duty cycle and the verified target injection number is achieved.

7. The method according to claim 1, wherein the switching of the previously verified target injection number is made when the air-fuel mixture has stabilized to a stoichiometric value, and the internal combustion engine is operated in the torque reserve including as idling, catalytic converter heating, particulate filter regeneration and coolant heating, wherein as a function of a deterioration in the efficiency of the internal combustion engine, switching to at least one additional partial injection takes place, so that an increase in the verified target injection number is made.

8. A computer program adapted to carry out the method according to claim 1 when executed on a computer, wherein the computer program is stored in a memory or a flash memory.

9. A control and/or regulation device for operating an internal combustion engine of a motor vehicle, in which the fuel is injected directly into a combustion chamber of the internal combustion engine, wherein the device is configured to control and/or regulate the method according to claim 1.

10. An internal combustion engine comprising at least one combustion chamber and a fuel injection device which injects the fuel directly into the combustion chamber, wherein the internal combustion engine comprises a control and l or regulation device according to claim 9.

11. The method according to claim 1, wherein the verified maximum possible number of partial injections is determined as a function of the minimum possible opening time of the fuel injector and the total fuel mass per duty cycle to be injected so that the critical mass threshold of the fuel injector is not undercut, wherein the mass-based switching of the verified mass-based target injection number to the lower maximum possible verified target injection number takes place before the critical mass threshold is reached, and wherein the mass-based switching of the verified mass-based target injection number to the maximum possible verified target injection number takes place if at least one further injection is possible without undercutting the critical mass threshold.

* * * * *